United States Patent [19]

Chen

[11] Patent Number: 5,670,607

[45] Date of Patent: Sep. 23, 1997

[54] MISCIBLE FORMS OF ELECTRICALLY CONDUCTIVE POLYANILINE

[75] Inventor: ChenChang Chen, East Brunswick, N.J.

[73] Assignee: Gumbs Associates, Inc., East Brunswick, N.J.

[21] Appl. No.: 659,250

[22] Filed: Jun. 7, 1996

[51] Int. Cl.$^6$ .................. C08G 63/68; C08G 75/00
[52] U.S. Cl. .................. 528/290; 528/422; 528/272; 528/278; 528/502; 528/503; 525/535; 525/540; 526/256; 526/258; 526/287; 526/288
[58] Field of Search .................. 528/290, 422, 528/271, 288, 502, 503; 525/535, 540; 526/256, 258, 287, 288

[56] References Cited

U.S. PATENT DOCUMENTS 4,983,322  1/1991  Elsenbaumer .................. 250/500
5,095,076  3/1992  Clement et al. .................. 525/435
5,115,057  5/1992  Ono et al. .................. 526/256

Primary Examiner—James J. Seidleck
Assistant Examiner—Duc Troung
Attorney, Agent, or Firm—Omri M. Behr, Esq.

[57] ABSTRACT

This invention relates to compositions of miscible electrically conductive polyaniline and to conductive articles formed from such compositions. Specifically, the invention relates to polyaniline dioctylsulfosuccinate which is miscible with some common organic solvents. UV-Visible spectra of dilute solutions of this polymer show a linear dependence of absorbance on concentration. Solution with high concentrations of polymer, >50 w/w %, can be prepared and uniform films can be cast from these solutions without any loss in electrical conductivity. The solutions and films are stable.

18 Claims, 3 Drawing Sheets

Structural representation of polyaniline

Leuco-emeraldine

Emeraldine base

Emeraldine salt

Pernigraniline

Figure 1. Structural representation of polyaniline
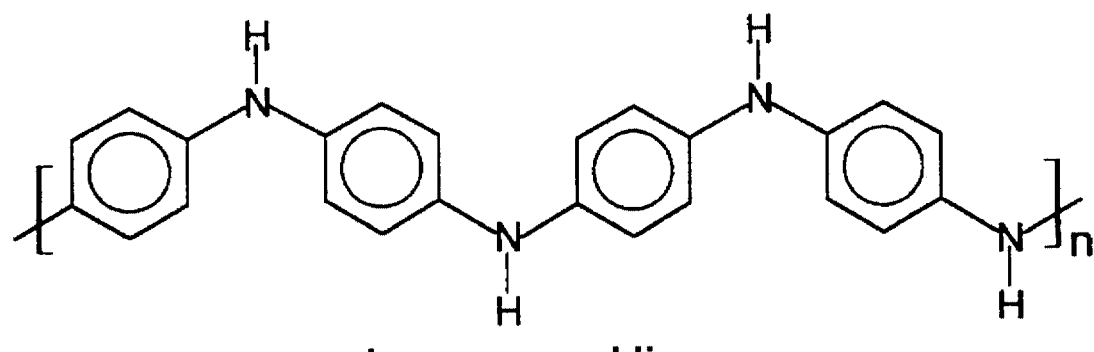
Leuco-emeraldine
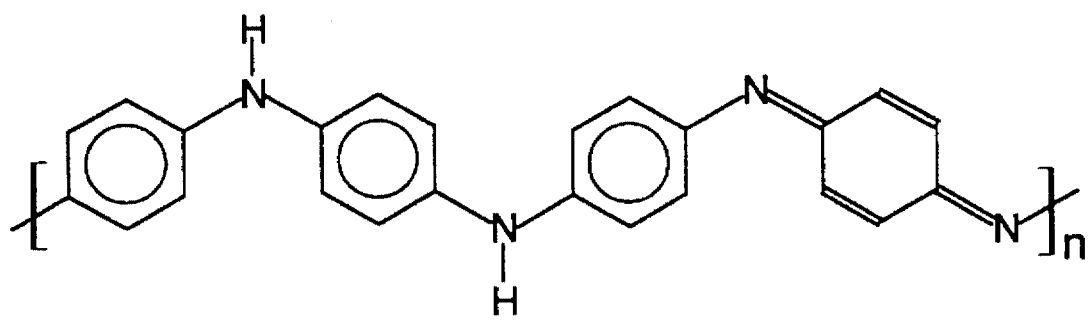
Emeraldine base
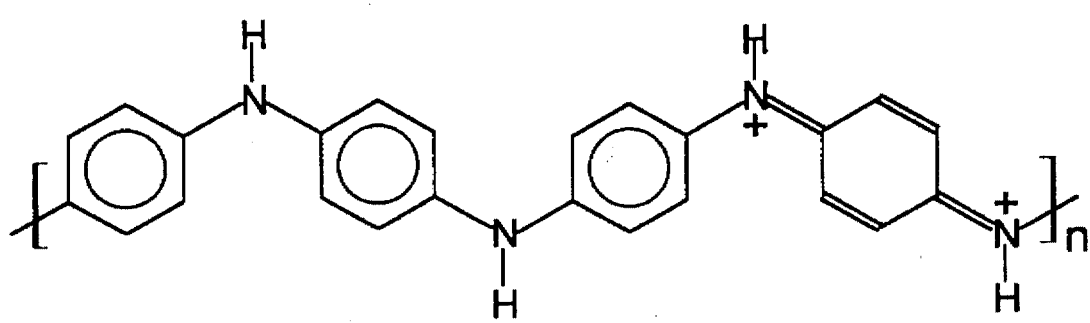
Emeraldine salt
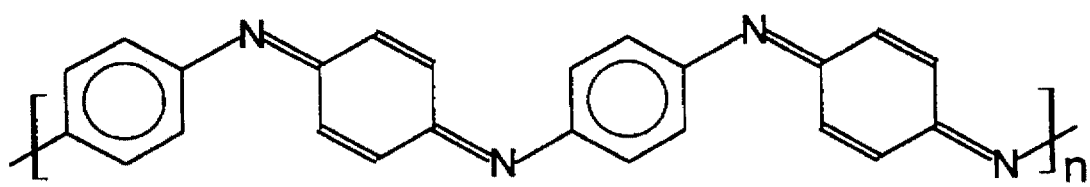
Pernigraniline Figure 2. Structure of the sodium salt of dioctylsulfosuccinic acid
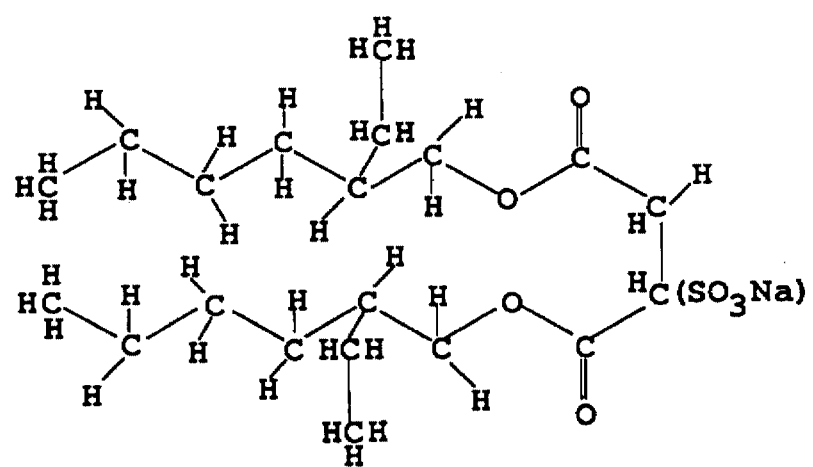

5,670,607

MISCIBLE FORMS OF ELECTRICALLY CONDUCTIVE POLYANILINE

FIELD OF THE INVENTION

This invention related to electrically conductive polyaniline dialkylsulfosuccinates, which are miscible with some common organic solvents and to compositions comprising this polyaniline. Another aspect of this invention relates to a method of using his polyaniline to give conducting polymer articles including films, coatings, inks and paints, and to fabricate such articles.

DESCRIPTION OF THE PRIOR ART

There is considerable interest in conjugated organic polymers because of their electrical conductivity. One such polymer that is especially attractive is polyaniline which is prepared from the oxidation of aniline. These conjugated structures give rise to stiff and rigid chains resulting in polymers that are insoluble and intractable. The prototypical conjugated polymer is polyacetylene, an unstable and intractable material. These materials become electrically conductive upon oxidation or reduction of the insulating form of the polymer, a process commonly referred to as doping.

Polyaniline is attractive because it is stable in air, its monomer is relatively inexpensive, and because its undoped form is soluble in N-methylpyrrolidone. Thus films can be cast from this solvent and after drying, they can be doped upon exposure to dopants such as hydrochloric acid.

Polyaniline alkyl sulfonates are partially soluble in organic solvents. Low molecular fractions can be extracted with methanol for example. As prepared using the sulfonic acid as dopant during the oxidation of aniline, polyaniline consists of particles of very fine particle size which are easily dispersed in organic solvents by the sulfonate counterion.

Recently, Heeger, et al (Y. Cao, P. Smith and A. J. Heeger, Synth. Met., 55–57 (1993) 3514, WO92/22911 (1992) reported the use of functionalized protonic acid solutes to render polyaniline soluble in organic solvents. A functionalized protonic acid is defined as $H^+M^-$ is a protonic acid group which may be sulfonic acid, carboxylic acid, phosphonic acid, sulfate or phosphate etc.; and R is an organic group. The proton of the protonic acid reacts with imine nitrogens of polyaniline and convert the base form to the conducting salt form; the (M-R) group serves as the counterion. R is chosen to be compatible with nonpolar or weakly polar organic liquids.

According to Heeger, polyaniline with hexanesulfonate, octanesulfonate, dioctylsulfosuccinate, camphorsulfonate and dodecylbenzenesulfonate as counterions is soluble in organic solvents if the acid is first mixed with emeraldine base using an agate mortar and pestle in an inert atmosphere. A suitable organic solvent is then added and the resulting mixture is placed in an ultrasonicator for 48 hours at 50° C. to prepare 2–8% solutions. Minor insoluble gels are removed by decanting and more concentrated solutions can be prepared using a twin screw mixer.

Polyaniline protonated with bis(2-ethylhexyl)phosphate or bis(2-methylpropyl(phosphate is partially soluble in common organic solvents such as toluene, decalin, tetrahydrofuran (THF) and chlorinated hydrocarbons. (A. Pron et al. Synthetic Metals, 55–57, (1993) 3520–3525.) The weight percent of polymer that is actually soluble in THF is 56% for the former and 28% for the latter.

The inclusion of volatile amines in compositions of emeraldine salts leads to solubility and cast films are electrically conductive after the evaporation of the amines. And previously, it was known that long chain alkyl groups on the nitrogen atom of polyaniline confer solubility in organic solvents. Further, the methoxy group in the ortho position leads to water soluble conducting polymers.

A recent patent (U.S. Pat. No. 4,983,322 to R. L. Elsenbaumer, assigned to Allied-Signal, Inc., Jan. 8, 1991) claims that solution processable forms of electrically conductive polyaniline are possible when the undoped form is reacted with a saturated solution of oxidant in an organic solvent.

Another route to solubility with electrical conductivity involves including dianiline and a flexible diamine in the charge during the oxidation of aniline. (U.S. Pat. No. 5,095,076 to S. A. Clement, D. P. Yamato and R. E. Cameron, assigned to Lockheed Corporation, Mar. 10, 1992.) This interrupts the conjugated sequences and renders the resulting copolymer more flexible.

A serious problem with solutions prepared by prior art is that the concentration of dissolved polymer is limited. Saturation and precipitation occurs at low concentrations. Consequently, when films are cast from these solutions precipitation occurs gradually upon drying as the concentration increases. As a result, the films do not coalesce and coherent films are not formed.

Another problem with previous reports of soluble and electrically conductive polyaniline is that dispersions rather than true solutions were in fact investigated. Thus polyaniline only appears to be soluble in concentrated sulfuric acid but upon standing over long periods of time it gradually precipitates or flocculates and there is considerable sediment at the bottom of the flask.

A need therefore exists for a soluble and electrically conductive polyaniline which can be used to prepare solvent-cast films, coatings, inks and paints in much the same fashion as organic polymers such as acrylics. What is needed is miscibility in organic solvents.

SUMMARY OF THE INVENTION

There is provided a process for the preparation of polyanilinedioctyl sulfosuccinate (hereinafter PaniDos) which comprises the sequential steps of preparing a solution of aniline in excess of an aqueous solution of a strong acid to form an aqueous solution of the corresponding aniline (strong acid) addition salt, adding to said solution, a solution of a strong oxidizing agent in the same aqueous acid, and thereafter adding to the thus produced polyaniline (strong acid) addition salt, an aqueous solution of dioctylsulfosuccinate salt whereby PaniDos is precipitated. Suitably, the precipitated PaniDos is collected, washed and dried.

As herein described, according to a crucial aspect of the present invention there is provided a miscible electrically conductive polyaniline and solutions thereof comprises of an ionized polyaniline backbone and dialkylsulfodicarboxylates, in particular dioctylsulfosuccinate as dopants. The dopant is believed to form a charge transfer complex with the polyaniline. The term miscible, as used herein, means that the electrically conductive polyaniline is infinitely soluble in certain organic solvents so that no precipitation of solute occurs upon evaporation of the solvent.

According to a further aspect of the invention is electrically conductive articles formed from this doped polyaniline. This invention also relates to a composition comprising a matrix of one or more thermoplastic or thermoset polymers having the polyaniline dialkylsulfodicarboxylates dispersed therein. This invention therefore relates to a process for preparing the composition of the invention by dissolving the polyaniline dialkylsulfodicarboxylates and one or more polymers in a suitable solvent. The preferred dicarboxylate of this invention is a succinate.

BRIEF DESCRIPTION OF DRAWINGS

FIG. 1 is a structural representation of polyaniline.

FIG. 2 is the structure of the sodium salt of dioctylsulfosuccinic acid.

DETAILED DESCRIPTION OF THE INVENTION

Figure 3:
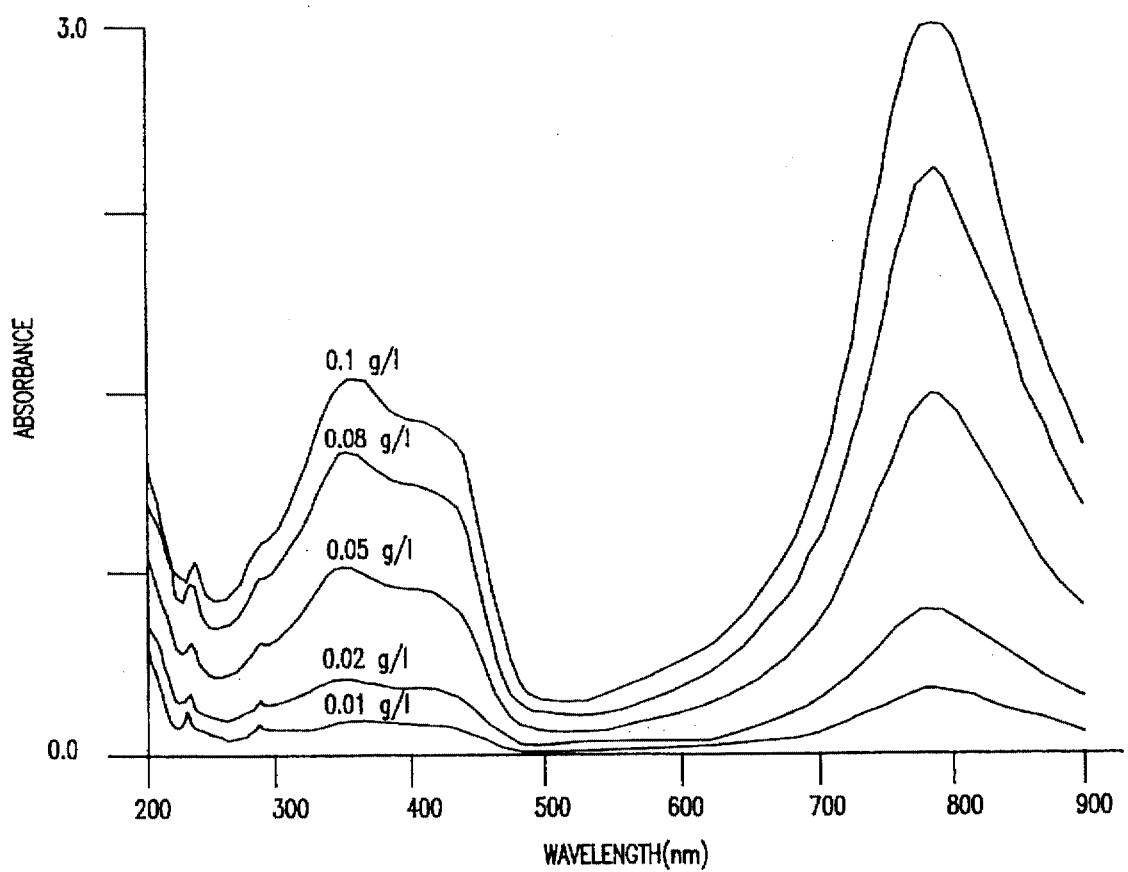
FIG. 3 shows the electronic absorption spectra of 5 solutions of different concentrations of polyaniline dioctylsulfosuccinate (DOS) in THF.

Applicant has discovered that polyaniline dialkylsulfocarboxylates, such as, polyaniline dioctylsulfosuccinate, are electrically conductive and that they are miscible with certain organic solvents, in particular, THF, toluene, and the like. Solutions containing, 30 percent by weight of polyaniline dioctylsulfosuccinate are stable with no sedimentation upon standing, and uniform and electrically conductive films can be cast from these solutions without the formation of a precipitate upon solvent evaporation. Polyaniline prepared in the presence of the sodium salt of dioctylsulfosuccinate herein is miscible with these solvents whereas polyaniline prepared with long chain alkyl sulfonates has limited solubility in organic solvents. Dialkylsulfosuccinates are unique as counterions and the presence of two tails and two ester groups on the molecule contributes to this miscibility that is not observed with the octane and other long chain alkyl sulfonates. The fact that true solutions rather than dispersions or suspensions are formed is confirmed with spectral measurements. UV-Visible spectroscopy of dilute solutions show a linear dependence of absorbance on concentration according to Beer's Law.

The miscible electrically conductive polyaniline of this invention comprises two essential ingredients. One essential ingredient is polyaniline (FIG. 1). In general, polyaniline for use in this invention is a homopolymer derived from the polymerization of aniline. In general, the number of aniline repeat units is at least 50. In the preferred embodiments of the invention, the number of aniline repeat units is greater than 50, and in the particularly preferred embodiments, the degree of polymerization is higher than 75. Amongst the particularly preferred embodiment, most preferred are those embodiments in which the number of repeat units exceeds 100. There appear to be no practical limit for the upper limit of molecular weight.

There is provided a process for the preparation of polyanilinedioctyl sulfosuccinate (hereinafter PaniDos) which comprises the sequential steps of preparing a solution of aniline in excess of an aqueous solution of a strong acid to form an aqueous solution of the corresponding aniline (strong acid) addition salt, adding to said solution, a solution of a strong oxidizing agent in the same aqueous acid, and thereafter adding to the thus produced polyaniline (strong acid) addition salt, an aqueous solution of dioctyl sulfosuccinate salt whereby PaniDos is precipitated. Suitably, the precipitated PaniDos is collected, washed and dried.

Suitably, the acid is a strong mineral acid or a strong organic acid. Preferably the acid is a aqueous hydrochloric acid. It may have a strength of between about 0.1M and 5M., suitably of between about 0.5M and 2M, most suitably about 1M.

In the initial step of the process there is utilized an excess of 1–5, suitably about 2–4 equivalents of acid per molecular unit of aniline. The reactions of all of the steps are carried out at an initial temperature of between about $-10°$ and $+10°$ C. for a predetermined time, suitably 15 to 120 minutes preferably about 60 minutes. Thereafter, the reaction is permitted to continue at ambient temperature, suitably for a similar time.

The polymerization of the aniline is caused by a strong oxidizing agent, suitably a peracid or salt thereof preferably persulfuric acid, an alkali metal or ammonium salt thereof, such as ammonium persulfate.

It should be obvious to those skilled in the art that substituted anilines can be conveniently used in the practice of this invention. Useful polyanilines can be prepared through use of chemical and electrochemical synthetic procedures. One form can be prepared by treating aniline with ammonium persulfate in excess aqueous 1M hydrochloric acid at $0°-5°$ C. This powdered form is green in color. After washing with 1M HCl and air drying, this material, emeraldine hydrochloride, has a conductivity of 1–10 S/cm. This conductive form of polyaniline and indeed all conductive forms, can be treated with 0.1M ammonium hydroxide in water to form a non-conductive form of polyaniline, emeraldine base, which is blue in color and which exhibits a conductivity of less than $10^{-8}$ S/cm. Numerous other chemical procedures for preparing various chemical forms of polyaniline have been reviewed in detail by Genies. (E. M. Genies et al, Synthetic Metals, 36 (1990) 139–182.)

Useful forms of polyaniline can also be prepared electrochemically. For example, polyaniline can be prepared by the electrochemical oxidation of aniline in aqueous acids on a platinum foil electrode. Electrochemical procedures for preparing polyaniline have also been reviewed by Genies.

Other chemical and electrochemical synthetic methods and transformations of he conductive form of polyaniline may be discovered and are presently contemplated as being useful. Moreover, additional forms or types of polyaniline may be elucidated in the future. Accordingly, no limitation to the synthesis, transformation, or structures herein described or postulated is intended beyond the appended claims.

The second essential ingredient of the miscible polyaniline of this invention is the dopant which, it is believed, forms a charge transfer complex with the polyaniline. The purpose of the dopant is to render the polyaniline electrically conductive. In general, such dopant solute is derived from a compound, which upon addition to polyaniline, ionizes the polymer with concomitant formation of a dopant solute species. The primary purpose of the essential dopants of this invention is to impart solubility to the electrically conductive polyaniline and the most useful dopant formed at the present time is that formed from ionization of the sodium salt of dioctyl sulfosuccinate (FIG. 2). It is believed and should be obvious to those skilled in the art that other salts of long chain dialkyl esters of sulfodicarboxylic acids will be useful. It should be noted that while the experimental results are set forth in terms of polyaniline dioctylsulfosuccinate, their extension to the broader class of materials included herein would be obvious to one skilled in the art. In general, while the alkyl chain may contain from 4 to 18 carbon atoms, alkyl chains having from 6 to 10 carbon atoms are believed to be preferred.

The amount of dopant added to polyaniline is important in achieving the desired conductivity and miscibility. In general, sufficient dopant is added to polyaniline to at least form doped polymer which is a semiconductor with a conductivity of at least about $10^{-3}$ S/cm. The upper level of conductivity is not critical and will usually depend on the application. In general, the highest level of conductivity obtained is provided without unduly affecting the environmental stability of the polymer. In the preferred embodiments of the invention, the amount of dopant employed is sufficient to provide a conductivity of at least about $10^{-3}$ S/cm, and in the particularly preferred embodiments is sufficient to provide a conductivity of from about $10^{-2}$ S/cm to about $10^{+2}$ S/cm. Amongst these particularly preferred embodiments, most preferred are those embodiments in which unsubstituted polyaniline is employed and i which sufficient dopant is used to provide a conductivity from about $10^{\circ}$ to about $10^{+2}$ S/cm usually being the amounts of choice. The minimum molar percent of DOS incorporated to render polyaniline miscible is 25% and the maximum is 50%. The minimum molar percent may vary with different dialkylsulfosuccinates. The amount of dopant incorporated is determined by the sulfur to nitrogen ration obtained by elemental analysis.

The method of forming the miscible polyaniline is not critical and may vary widely. Only the choice of counterion is critical. Useful processes include direct chemical polymerization of aniline in the presence of the sodium salt of the dialkylsulfosuccinate or its acid. Another process is electrochemical polymerization of aniline in the presence of the acid. Another process is the direct reaction of he acid with emeraldine base. Yet another process of forming the polyaniline of this invention involves the exchange of dopants in polyaniline with the dopant solute of this invention. For example, the dialkylsulfosuccinate in incorporated into polyaniline by adding a solution of its sodium to a dispersion of any other emeraldine salt and allowing the exchange to take place.

Suitable solvents for Polyaniline DOS are listed below in decreasing order of solvating strength, these same solvents should also be suitable for other polyaniline dialkylsulfodicarboxylates included in this invention.

THF
Chloroform
Methylene Chloride
Hexamethylphosphoramide
Xylene
Meta-Cresol
2-Butoxyethanol
Toluene
Benzene
Tetrahydrofurfuryl Alcohol
Ethylene Glycol Dimethyl Ether
N-methylpyrrolidone
Dimethylformamide
Cyclohexanone
Acetone
Ethylacetate
Dimethyisulfoxide
Propanol
Ethanol
Ethyl Ether Polyaniline DOS is insoluble in acetonitrile, methanol, carbon tetrachloride, aliphatic hydrocarbons, and water.

The UV-Visible spectra of solutions of known concentrations are illustrated in FIG. 2 and Beer's plots are displayed in FIG. 3. It is immediately apparent that Beer's Law is obeyed. UV-Visible spectroscopy of solutions is a powerful technique for determining whether the mixture is a dispersion or a solution. In the case of a dispersion, the solid particles eventually settle to the bottom during dilution and the absorbance is significantly lower than that predicted by the application of Beer's Law.

A further confirmation of quantitative determination of solubility is obtained by preparing mixtures of known proportions of Polyaniline DOS and solvent in a test tube and mixing in the ultrasonicator for one hour. After the mixtures are allowed to stand overnight, the solids content of the supernatant is measured and compared with the original proportions added.

Another aspect of this invention relates to a composition comprising one or more miscible electrically conductive polyanilines of this invention, and one or more solution processible thermoplastic or thermoset polymers. One advantage of this composition is that he properties of the insulating matrix may be incorporated into the electrically conductive film. The proportion of polyaniline to thermoplastic or thermoset is not critical and may vary widely, depending on the intended uses.

The composition of this invention may include various optional components such as plasticizers, blending aids, flame retardants and the like, or other additives used in coatings and paints. (Modern Plastics Encyclopedia Edition, October, 19912, pages 143–198.) These other additives may vary widely and may include any material known for use in conventional polymer compositions.

The composition of this invention can be prepared using conventional solution blending techniques such as ball milling or ultrasonic mixing. The composition may be applied to the substrate by conventional methods such as spray, brush, roller, blade, etc. In the preferred embodiments of the invention the doped polyaniline is mixed with the solvent using ultrasonication. Thereafter the thermoplastic or thermoset and other ingredients are added to the solution. The order of mixing of the various components is not critical. Accordingly, the order of addition of the polymers and other additives to form the intimate mixture described in the examples given below can be varied as desired.

The electrically conductive and miscible polyaniline of the invention and the composition of this invention can be used for any purpose for which conductible polymers are useful. (S. Roth and W. Grayoner, Synth. Met., 55–57 (1993) 3623–3631.) The article referred to is incorporated herein by reference. Examples of articles include conductive polymer coatings and paints for electromagnetic interference shielding of sensitive electronic equipment such as microprocessors, infrared, radio frequency and microwave absorbing shields, corrosion-preventing coatings for corrodible materials such as steel, antistatic coatings for packaging electronic components, and the like.

The following specific examples are presented to more particularly illustrate the invention, and should not be construed as being limitations on the scope and spirit of the invention.

EXAMPLE 1

Preparation of Poly(aniline dioctyl sulfosuccinate)

Three separate solutions were prepared and chilled to 0° C.±5°. Solution A contains aniline (2 ml) and 60 ml 1M aqueous HCl. Solution B contains ammonium persulfate (6.0 g) dissolved in 40 ml 1M aqueous HCl. Solution C consists of 5.3 g sodium DOS dissolved in 100 ml deionized water.

Solution B was added to Solution A over 30 minutes while the temperature was maintained at 0° C.±5°. The reaction mixture was allowed to proceed for another 30 minutes at this temperature and then Solution C was added and dopant exchange allowed to take place for 30 minutes at 0° C.±5°. The ice-water bath was removed and the exchange reaction continued for 1 hour at ambient temperature.

The solid was collected by filtration followed by washing with deionized water and then air-drying. The conductivity of a pressed pellet was 2–4 S/cm. Elemental analysis showed 62.37% C, 7.84% H, 4.96% N, 5.24% S, and 17.57% O, indicating a doping level of 46.2%. The yield of polymer was 5.75 grams or 86.7% conversion. The polymer thus prepared is very soluble in certain organic solvents with no sediment upon standing. Therefore all fractions of polymer dissolve. Solutions containing 30% polyaniline DOS have been prepared.

EXAMPLE 2

Preparation of Poly(aniline p-toluenesulfonate)

Two separate solutions were prepared and chilled at 0°–5° C. Solution A contains aniline (4 ml) and 56 ml 1M aqueous p-toluenesulfonic acid. Solution B contains ammonium persulfate (2.3 g) dissolved in 40 ml 1M aqueous p-toluenesulfonic acid.

Solution B was quickly added to Solution A with magnetic stirring in an Erlenmeyer flask immersed in an ice-water bath at 0°–5° C. The resulting suspension was stirred for 2 hours and the solids were collected by filtration and washed with water until the filtrate was clear. After drying in air overnight, the polymer had a conductivity of 1 S/cm as determined on a pressed pellet using the four-point probe method. The polymer was insoluble in all common solvents such as alcohols, esters, hydrocarbons, ketones and the like.

One gram of the emraldine salt was stirred overnight in 1 liter of 0.1M aqueous ammonium hydroxide and the resulting emeraldine base was collected by filtration washing with 0.1M ammonium hydroxide, and air drying.

EXAMPLE 3

Preparation of Poly(aniline octanesulfonate)

The procedure in Example 1 was used except that sodium 1-octane sulfonate was used in place of sodium DOS and in the solid state. The polymer exhibited a conductivity of 1 S/cm and was insoluble in organic solvents.

EXAMPLE 4

Preparation of Poly(aniline dodecylbenzene sulfonate)

The procedure in Example 1 was used except that sodium dodecyl benzene sulfonate was used as the dopant and in the solid state. The polymer exhibited a conductivity of 1 S/cm and was insoluble in organic solvents.

EXAMPLE 5

To a solution of polyaniline DOS (1 g) in THF (9 g) was added 1 g Geon 121, a polyvinyl chloride resin sold by B. F. Goodrich, 1 g dioctyl phthalate and 0.3 g Mark 2077 LV, a stabilizer. The mixture was stirred for 5 minutes with a mechanical stirrer and films were cast from the solution. The films after drying were electrically conductive and very flexible.

What is claimed is:

1. Process for the preparation of polyanilinedioctyl sulfosuccinate (PaniDos) which comprises the sequential steps of a) preparing a solution of aniline in excess of an aqueous solution of a strong acid to form an aqueous solution of the corresponding aniline (strong acid) addition salt, b) adding to said solution, a solution of a strong oxidizing agent in the same aqueous acid, c) adding to the mixture produced by steps a) and b) an aqueous solution of dioctyl sulfosuccinate salt whereby PaniDos is precipitated.

2. The process of claim 1 additionally comprising collecting the precipitated PaniDos.

3. The process of claim 2 additionally comprising the steps of washing the precipitate and drying it.

4. The process of claim 1 wherein the acid is a strong mineral acid.

5. The process of claim 1 wherein the acid is a strong organic acid.

6. The process of claim 1 wherein the acid is a aqueous hydrochloric acid.

7. The process of claim 6 wherein the acid has a strength of between about 0.1M and 5M.

8. The process of claim 6 wherein the acid has a strength of between about 0.5M and 2M.

9. The process of claim 1 wherein there is utilized an excess of 2–4 equivalents of acid per molecular unit of aniline.

10. The process of claim 1 wherein the reactions of steps a), b) and c) are carried out at an initial temperature of between about −10° and +10° C. for a predetermined time.

11. The process of claim 1 wherein after said predetermined time, the reaction is permitted to continue at ambient temperature.

12. The process of claim 1 wherein the oxidizing agent is a peracid or salt thereof.

13. The process of claim 1 wherein the oxidizing agent is persulfuric acid, an alkali metal or ammonium salt thereof.

14. The process of claim 13 wherein the oxidizing agent is ammonium persulfate.

15. The process of claim 1 wherein in step c) there is utilized sodium dioctyl succinate.

16. Process for the preparation of polyanilinedioctyl sulfosuccinate (PaniDos) which comprises the sequential steps of a) preparing a solution of aniline in excess of an aqueous solution of hydrochloric acid containing about 4 equivalents of said acid per mole of aniline charged to form an aqueous solution of the corresponding Pani (hydrochloric acid) addition salt, b) adding to said solution, at a temperature of between −5° and +5° C., a solution of a sodium persulfate in the same aqueous acid, allowing the mixture to warm to ambient temperature, again cooling the mixture to the previous temperature range and c) adding to the mixture produced by steps a) and b) similarly cooled aqueous solution of dioctyl sulfosuccinate salt permitting the reaction to proceed for a predetermined time and permitting it to warm to ambient temperature whereby PaniDos is precipitated.

17. The process of claim 16 additionally comprising collecting the precipitated PaniDos by filtration.

18. The process of claim 17 additionally comprising the steps of washing the precipitate with deionized water and air drying it at between 55° and 80° C.

* * * * *